UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

HALOGENATED RED VAT-DYE AND PROCESS OF MAKING SAME.

No. 867,715.

Specification of Letters Patent.

Patented Oct. 8, 1907.

Application filed March 23, 1907. Serial No. 364,022.

*To all whom it may concern:*

Be it known that I, GADIENT ENGI, doctor of philosophy and chemist, a citizen of the Swiss Republic, and a resident of Basel, Switzerland, have invented a new and useful Halogenated Red Vat-Dyeing Dyestuff and a Process for the Manufacture of the Same, of which the following is a full, clear, and exact specification.

In the United States Letters Patent No. 831844 dated September 25th, 1906, I have described the manufacture of a red vat-dyeing dyestuff, by heating salicyl-thioacetic acid

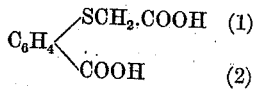

in the presence of an aromatic nitro hydrocarbon. Since I have found, that this dyestuff, which has the constitution of a thioindigo corresponding to the formula

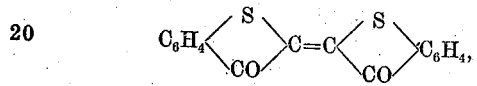

can be transformed by its treatment with halogens or halogenating agents into new valuable halogenated derivatives having a greater affinity to cotton and being faster to washing. The manufacture of these new halogenated derivatives of thioindigo is illustrated by the following example.

A mixture of 5 parts of thioindigo, 50 parts of nitrobenzene and 16 to 18 parts of bromin is allowed to stand for about 24 hours in a reflux apparatus at the ordinary temperature and then heated in an oil bath for about 3 hours in the said reflux apparatus, the temperature of the bath being 130 to 135° C. After cooling the mass is filtered and the solid matter is washed with alcohol and dried. The dyestuff obtained in this manner forms a gray-violet crystalline powder yielding by its treatment with alkalin reducing agents a light-yellow colored vat from which unmordanted cotton is dyed in Bordeaux-red tints of excellent fastness to washing, light and chlorin.

In concentrated sulfuric acid, the new dyestuff dissolves to a bluish green solution from which red-violet flocks are separated on addition of water. It is sparingly soluble in hot benzene with a violet red coloration and a pale yellow fluorescence and easily suluble in hot nitrobenzene with a raspberry-red coloration and a pale yellow fluorescence.

What I claim is:

1. The described process for the manufacture of halogenated vat-dyeing dyestuffs, by treating thioindigo

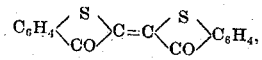

with a halogen, in presence of an indifferent diluent.

2. The described process for the manufacture of a halogenated vat-dyeing dyestuff by treating thioindigo with bromin in presence of nitrobenzene.

3. As new products the described halogenated vat-dyeing dyestuffs, which can be obtained by treating thioindigo with a halogen in presence of an indifferent diluent.

4. As a new product, the herein described bromoderivative of thioindigo, which is obtained by treating thioindigo with bromin in presence of nitrobenzene, constituting in dry state a greyish violet crystalline powder, soluble in concentrated sulfuric acid to a bluish green solution from which a red-violet precipitate is separated on addition of water, sparingly soluble in hot benzene with a violet-red coloration, easily soluble in hot nitrobenzene with a raspberry red coloration and yellow fluorescence and yielding by treatment with alkaline reducing agents a light-yellow colored vat, from which unmordanted cotton is dyed in bordeaux-red shades.

In witness whereof I have hereunto signed my name this 2 day of March 1907, in the presence of two subscribing witnesses.

GADIENT ENGI.

Witnesses:
GEO. GIFFORD,
AMAND BRAUN.